3,600,402
METHOD OF ISOLATING GIBBERELLINS FROM CULTURE FLUID OBTAINED BY CULTIVATING A MICROORGANISM

Raisa Leonidovna Krutova, Ul. Krasina 86, kv. 15, Kurgan, U.S.S.R.; Georgy Sergeevich Muromtsev, 1 ul. Oktyabrskogo polya 21, kv. 175, Moscow, U.S.S.R.; and Eleonora Nikolaevna Pervy, Poltavskaya, ul. 9, kv. 47; and Jury Sergeevich Rakovsky, Ul. Kirova 147, kv. 75, both of Kurgan, U.S.S.R.
No Drawing. Filed Oct. 24, 1968, Ser. No. 770,389
Int. Cl. C07d 5/32
U.S. Cl. 260—343.3                                   5 Claims

ABSTRACT OF THE DISCLOSURE

A method of isolating gibberellins from culture fluid obtained by cultivating an organism, e.g., the fungus *Fusarium moniliforme* Sheld., which comprises precipitation of gibberellins with iron salts at a pH of 2.5–4.5 with subsequent separation of the precipitate and drying.

---

The present invention relates to methods of isolating gibberellins from a culture fluid obtained by cultivating a gibberellin-producing microorganism, e.g., the fungus *Fusarium moniliforme* Sheld., on a nutrient medium.

Gibberellins are used in plant growing as growth stimulators and also in the brewing industry in producing malt.

Known methods of isolating gibberellins from culture fluids are based on adsorption, extraction and ion-exchange.

The adsorption method of isolating gibberellins comprises adsorbing gibberellins from culture filtrates on activated charcoal followed by eluting said gibberellins with an organic solvent, e.g., aqueous acetone, and evaporating the resulting eluate under vacuum to obtain an aqueous residue from which gibberellins are extracted with ethyl acetate and crystallized.

The extraction method consists in extracting gibberellins from culture filtrates with organic solvents immiscible with water (butanol, ethyl acetate, etc.), followed by extraction of gibberellins from the extract with an aqueous alkaline solution and repeated extraction of gibberellins from the resulting solution with an organic solvent after acidification.

The above operations may be repeated several times. From the last aqueous phase gibberellins are extracted with ethyl acetate with subsequent crystallization after evaporation under vacuum.

According to the ion-exchange method a culture filtrate is passed through a series of ion-exchange columns, after which gibberellins are eluted with aqueous alkaline or salt solutions or mixtures of the same and then extracted from the aqueous phase with ethyl acetate and crystallized.

Among the disadvantages of the amove methods of isolating gibberellins from culture fluid are the complexity of the production process and the use of large amounts of reactants including explosive and flammable organic solvents.

The primary object of the present invention is to provide a simplified method of producing a crystalline gibberellin preparation.

The foregoing and other objects have been accomplished by providing a method of isolating gibberellins from culture fluid obtained by fermenting a microorganism, e.g., *Fusarium moniliforme* Sheld., on a nutrient medium, wherein, according to the invention, gibberellins are precipitated from culture filtrate with iron salts at pH 2.5–4.5 with subsequent separation of the resulting precipitate and drying.

To produce a crystalline gibberellin preparation, the precipitate containing gibberellins is treated with an alkaline solution and the resulting gibberellin solution is separated from the insoluble residue after which gibberellins are extracted with an organic solvent and crystallized.

A preferred embodiment of the invention contemplates the use of 0.3–0.7% ammonium hydroxide for extracting gibberellins from the precipitate.

Iron chlorides with the addition of sodium chloride are preferably employed for precipitating gibberellins.

Precipitation of gibberellins with iron salts is preferably carried out at pH 3.2–3.4.

The present method of isolating gibberellins is embodied as disclosed herein below.

To a culture fluid of the fungus *Fusarium moniliforme* Sheld. is added a 5% barium chloride solution in the amount of 5% of the culture fluid by volume.

The mixture is let stand for about 30 min. and filtered. To the culture filtrate are added iron salts. Any iron salt can be employed for precipitating gibberellins but iron chlorides ($FeCl_3$ or $FeCl_2$) with the addition of sodium chloride are to be preferred.

The filtrate is stirred until the above salts are dissolved and the pH is adjusted to 2.5–4.5.

The precipitate, which is a complex compound of gibberellins and iron and chloride ions, is filtered off, dried and comminuted. The resulting product is a dry powder of crude gibberellins which is dissolved in 0.3–0.7% ammonium hydroxide for use in plant growing.

To obtain a crystalline gibberellin preparation the precipitate containing gibberellins is treated with an alkaline solution, preferably 0.3–0.7% ammonium hydroxide. The solution thus obtained is acidified to pH 2.0–2.2 and gibberellins extracted with ethyl acetate. The ethyl acetate concentrate is dried over calcium chloride ($CaCl_2$), purified with activated charcoal and evaporated under vacuum until gibberellins crystallize.

The present method makes it possible to simplify the process of producing crystalline gibberellins and also to obtain a stable crude gibberellin preparation while reducing the consumption of explosive and flammable organic solvents.

For a better understanding of the present invention the following examples embodying the method of isolating gibberellins from culture fluid are given by way of illustration.

EXAMPLE 1

To 1,500 liters of culture fluid of the fungus *Fusarium moniliforme* Sheld. with a gibberellin content of 1,477 mg./liter (in a 3 m.$^3$ fermentation tank) is added a 5% barium chloride solution in the amount of 5% of the culture fluid by volume (75 liters of 5% barium chloride). The mixture is let stand for 30 min. and then filtered on a plate-and-frame filter press. The mycelium is washed on the filter press with 300 liters of tap water and the filtrate and washings are collected in a 2,000-liter enamelled tank. To 1,550 liters of the culture filtrate containing 1,250 mg. of gibberellins per liter are added 5.8 kg. of iron chloride (3 g. of 100% iron chloride per gram of gibberellins) and 77.5 kg. of sodium chloride (50 g. per liter of filtrate).

The filtrate is stirred until the added salts are dissolved after which the pH is adjusted to 3.2 with 20% sodium hydroxide and the solution let stand for an hour. The precipitate that forms is filtered off through belting duck and filter cloth (one layer each). After filtering, the precipitate on the press is blown through with compressed air and discharged.

The resulting complex precipitate containing gibberellins and impurities is dried at 70–80° C. and ground in a ball mill. The resulting product is a light-brown powder containing 109.5 mg. of gibberellins per gram.

Gibberellin yield, 81%.

EXAMPLE 2

To 5.1 liters of culture filtrate with a gibberellin content of 1,690 mg./liter (total 8.6 g.) are added 25.8 g. of iron chloride (3 g. of 100% iron chloride per gram of gibberellin) and 255 g. of sodium chloride (50 g. per liter of culture filtrate).

The filtrate is stirred until the salts are dissolved, after which the pH is adjusted to 3.4 with ammonium hydroxide and let stand for an hour. The resulting precipitate is filtered off on a Büchner funnel through two layers of filter paper. To the moist precipitate (178 g. containing 45 mg. of gibberellins per gram) are added 300 ml. of 2.5% ammonium hydroxide to obtain a gibberellin concentration of 20,000 mg./liter and the mixture is stirred thoroughly for an hour.

After stirring, the mixture is filtered on a Büchner funnel and the precipitate washed on the funnel with 200 ml. of 2% ammonium hydroxide (half the volume of the filtered mixture which is 400 ml.).

The resulting main gibberellin concentrate (285 ml. with a concentration of 19,000 mg. per liter) and the washings (200 ml. with a concentration of 4,250 mg. per liter are combined, acidified with concentrated hydrochloric acid to pH 2–2.2 and extracted with ethyl acetate. The aqueous solution of gibberellins is extracted three times with portions of ethyl acetate equal to 0.2 of the volume of the solution. Subsequent extractions are done with portions equal to 0.1 of the volume. Extraction is continued until the gibberellin content of the aqueous solution falls to 500 to 700 mg./liter. The combined ethyl acetate extract (440 ml. with a concentration of 12,950 mg./l.) is dried over calcium chloride and purified with activated charcoal. This is done by adding 1% of activated charcoal, stirring for 10 min. and filtering through two layers of filter paper on a Büchner funnel.

The dried and purified ethyl acetate concentrate is evaporated under vacuum at 45° until crystals form. Yield of crystalline gibberellins is 2.66 g.; assay 85%; M.P. 215–217° C.

We claim:

1. A method of isolating gibberellins from a culture filtrate obtained by cultivating a gibberellin-producing microorganism, in a nutrient medium and filtering the culture fluid which comprises precipitating gibberellins from the culture filtrate with iron salts at a pH 2.5–4.5 with subsequent separation of the precipitate and drying.

2. A method as claimed in claim 1, which further comprises treating the precipitate containing gibberellins with an aqueous alkaline solution, separating the resulting gibberellin solution from the insoluble residue, acidifying extracting the gibberellins from the acidic solution with a water-immiscible organic solvent for gibberellins and crystallizing gibberellins from the organic solvent extract.

3. A method as claimed in claim 2, wherein 0.3–0.7% ammonium hydroxide is employed as the aqueous alkaline solution.

4. A method as claimed in claim 1, wherein the iron salts are iron chlorides.

5. A method as claimed in claim 1, wherein the precipitation of gibberellins with iron salts is carried out with the addition of sodium chloride.

References Cited

FOREIGN PATENTS 819,110    8/1959    Great Britain ____ 260—343.3G

ALEX MAZEL, Primary Examiner

B. I DENTZ, Assistant Examiner

U.S. Cl. X.R.

71—89; 195—36